United States Patent
Nyman et al.

(10) Patent No.: US 6,432,370 B1
(45) Date of Patent: Aug. 13, 2002

(54) METHOD AND APPARATUS FOR CONTROLLABLY CONDUCTING A SOLUTION, OBTAINED FROM LIQUID-LIQUID EXTRACTION OF TWO SOLUTIONS AND MIXED INTO DISPERSION, TO A WIDE SETTLER

(75) Inventors: Bror Nyman, Vanha-Ulvila; Launo Lilja; Stig-Erik Hultholm, both of Pori; Juhani Lyyra; Raimo Kuusisto, both of Espoo; Petri Taipale, Vantaa, all of (FI); Timo Saarenpää, Santiago (CL)

(73) Assignee: Outokumpu Oyj, Espoo (FI)

( * ) Notice: Subject to any disclaimer, the term of this patent is extended or adjusted under 35 U.S.C. 154(b) by 0 days.

(21) Appl. No.: 09/486,016

(22) PCT Filed: Aug. 26, 1998

(86) PCT No.: PCT/FI98/00656
§ 371 (c)(1),
(2), (4) Date: May 8, 2000

(87) PCT Pub. No.: WO99/11830
PCT Pub. Date: Mar. 11, 1999

(30) Foreign Application Priority Data

Aug. 28, 1997 (FI) .................................................. 973547

(51) Int. Cl.[7] ............................. B01D 11/04; C02F 1/44
(52) U.S. Cl. ..................... 422/256; 422/258; 422/259; 210/634
(58) Field of Search ................................ 422/256, 257, 422/258, 259; 210/511, 520, 522, 634

(56) References Cited

U.S. PATENT DOCUMENTS

| | | | | |
|---|---|---|---|---|
| 1,594,024 A | * | 7/1926 | Soule | 422/259 |
| 2,668,756 A | * | 2/1954 | Carney | 422/259 |
| 2,682,453 A | * | 6/1954 | Holder et al. | 422/259 |
| 2,759,801 A | * | 8/1956 | Yeager et al. | 422/259 |
| 2,851,396 A | * | 9/1958 | Myers | 422/259 |
| 3,286,992 A | * | 11/1966 | Armeniades et al. | 422/259 |
| 3,997,445 A | * | 12/1976 | Hannestad | 422/259 |
| 4,221,658 A | * | 9/1980 | Hardwick | 422/259 |
| 4,268,484 A | * | 5/1981 | Gavin | 422/259 |
| 4,277,445 A | * | 7/1981 | De Shepper et al. | 422/259 |
| 4,294,702 A | * | 10/1981 | Finsterwalder | 422/259 |
| 5,662,871 A | * | 9/1997 | Nyman et al. | 422/259 |

* cited by examiner

Primary Examiner—Robert J. Warden, Sr.
Assistant Examiner—Imad Soubra
(74) Attorney, Agent, or Firm—Smith-Hill and Bedell (57) ABSTRACT

In a method according to the invention, a dispersion coming from a mixer part is conducted from downwards to the liquid part of the settler, into the middle part of the feed end, wherefrom it is set to be distributed to inside the settler part, in a closed channel-like space located in the immediate vicinity of the settler along the whole width of the settler and the flow therefrom mainly above the channel-like part towards the rear end of the settler. The method according to the invention is realized by means of an apparatus where an uptake shaft extending from the dispersion mixing tank to the settler opens into the feed end of the settler, from where there are further directed distribution channels towards the settler side edges. The distribution channels are placed in the bottom part of the settler.

32 Claims, 8 Drawing Sheets

METHOD AND APPARATUS FOR CONTROLLABLY CONDUCTING A SOLUTION, OBTAINED FROM LIQUID-LIQUID EXTRACTION OF TWO SOLUTIONS AND MIXED INTO DISPERSION, TO A WIDE SETTLER

The present invention relates to a method for conducting the solutions of liquid-liquid extraction, which are mixed into dispersion in a mixing tank, from the mixing tank further to a settler. The dispersion created in the mixing tank is fed, by means of the method and apparatus of the present invention, into the settler through distribution channels arranged along the whole width of the settler to extend over the whole width of the settler before said dispersion is made to be discharged into the settler proper.

As regards the liquid-liquid extraction solutions, the organic solution is generally composed of a kerosene-type hydrocarbon and an extraction agent proper dissolved therein, and the second solution is an aqueous solution. The solutions are mixed into dispersion in a mixing tank, which can constitute one or several mixers. From the last mixer, the dispersion is conducted to a settler where it is divided into two separate phases, and the phases are classified as two superimposed layers on the basis of gravity.

From the Fl patent 96968, there is known a method according to which from the last mixer of the mixing tank there is access to an uptake shaft which opens in the front wall of the settler, and through which the dispersion is set to enter the settler as a horizontal flow.

As regards very wide settler arrangements, a dispersion fed in through the middle of the settler is not evenly distributed over the whole cross section of the settler, but side currents along the feed edge of the settler become so strong that the situation is difficult to control solely by means of picket fences which are normally used for guiding the flow. Moreover, it should be taken into account that the flow quantities may vary, which also causes unstability.

As for the settler feeding arrangements, it has been troublesome to turn over to larger solution flows, because along with larger total flows, the bottom of the mixing tanks must be built further and further down, and consequently further from the settler bottom level. This is due to the fact that mixer dimensions are designed according to a given solution delay time, and settlers are respectively designed on the basis of a given settling capacity determined according to area proportions. With large total flows, this means that the mixing tank bottoms are 2–5 m lower than the settler bottom.

A liquid-liquid separation carried out under the influence of gravity requires a settler with an area that grows directly in proportion to the solution quantities to be separated. For instance in copper extraction, in order to separate said solution quantities form each other, there is needed an area of 0.2 m$^2$ per each solution cube separated in an hour (m$^3$/h). However, this requires that there are no disturbing turbulent circulations in the settler, because said circulations easily lower the separating capacity of the settler. From the point of view of separating the solutions, it is advantageous that there is achieved an even plug-like flow in the settler over the whole cross sectional area flow. It has also been observed that the linear rate of the solution must not exceed a certain critical limit, if the amount of the residual drops of one solution contained in the other should be kept low.

In copper extraction, the linear speed limit for the organic solution is considered to be 6 cm/s, and in large plants, this is easily exceeded. The layer thickness of the organic solution is generally not desired to be raised above 30 cm, because when the layer thickness grows, also the quantity of the expensive extraction agent in the solution grows, and this increases the costs. Thus the widening of the settler is an important way to prevent the linear speed from growing too high. The need for widening the settler also is apparent from the appended table that shows how the settler width develops when the employed layer thickness for the organic solution is 30 cm, and the linear speed is kept at the value of 5.5 cm/s.

| Settler width/m | Total solution flow/m$^3$/h (organic/aqueous solution 1:1) |
| --- | --- |
| 8.4 | 1,000 |
| 16.8 | 2,000 |
| 25.3 | 3,000 |
| 33.7 | 4,000 |
| 42.1 | 5,000 |
| 50.5 | 6,000 |

The present invention relates to a method and apparatus for conducting the dispersion evenly to a wide settler, particularly a settler that is more than 25 m wide, although it is obvious that the arrangement can also be used in narrower settlers, where a fluent and correct operation of the settler should be ensured. In the method according to the invention, the dispersion coming from the mixing part is conducted from downwards to the liquid part of the settler, advantageously to the middle region of the feed end, wherefrom it is made to be distributed to inside the settler, in a channel-like closed space along the whole width of the settler, placed in the immediate vicinity of the settler front edge, and to flow therefrom, mainly above the channel-like part, towards the rear end of the settler. The method according to the invention is realized by means of an apparatus where an uptake shaft leading from the dispersion mixer part to the settler is opened towards the settler feed end, from where there are further directed distribution channels towards the settler side edges. The distribution channels are located in the bottom part of the settler. The essential novel features of the invention are apparent from the appended claims.

The invention is described in more detail with reference to the appended drawings, wherein.

Figure 1:
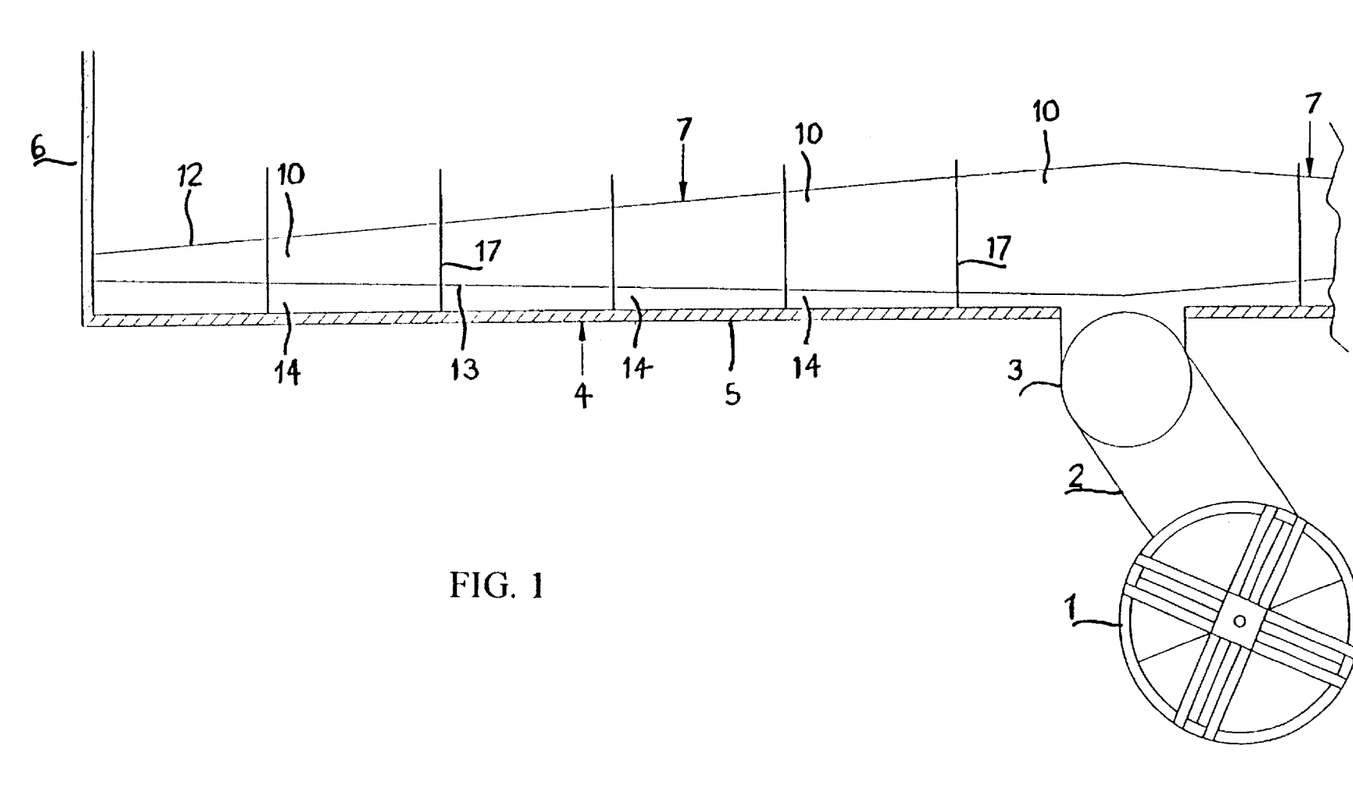
FIG. 1 illustrates a particularly advantageous structure of uptake shaft and channel according to the invention, seen as a partial top-view elevation.

The solutions of a liquid-liquid extraction are mixed to each other in a mixing tank which can comprise one or several mixers, the last of which is marked with number 1 in FIG. 1. The mixer 1 is connected, by intermediation of a dispersion channel 2, to a cylindrical uptake shaft 3, which again is located outside a settler 4, close in front of the middle part of the settler feed end 5. The uptake shaft may also have some other shape; it may be for example rectangular in cross-section. To the uptake shaft 3, there are connected closed distribution channels 7 extending from the middle region of the settler to both side walls 6 thereof; only one of said distribution channels 7 is completely seen in the drawing.

Figure 2:
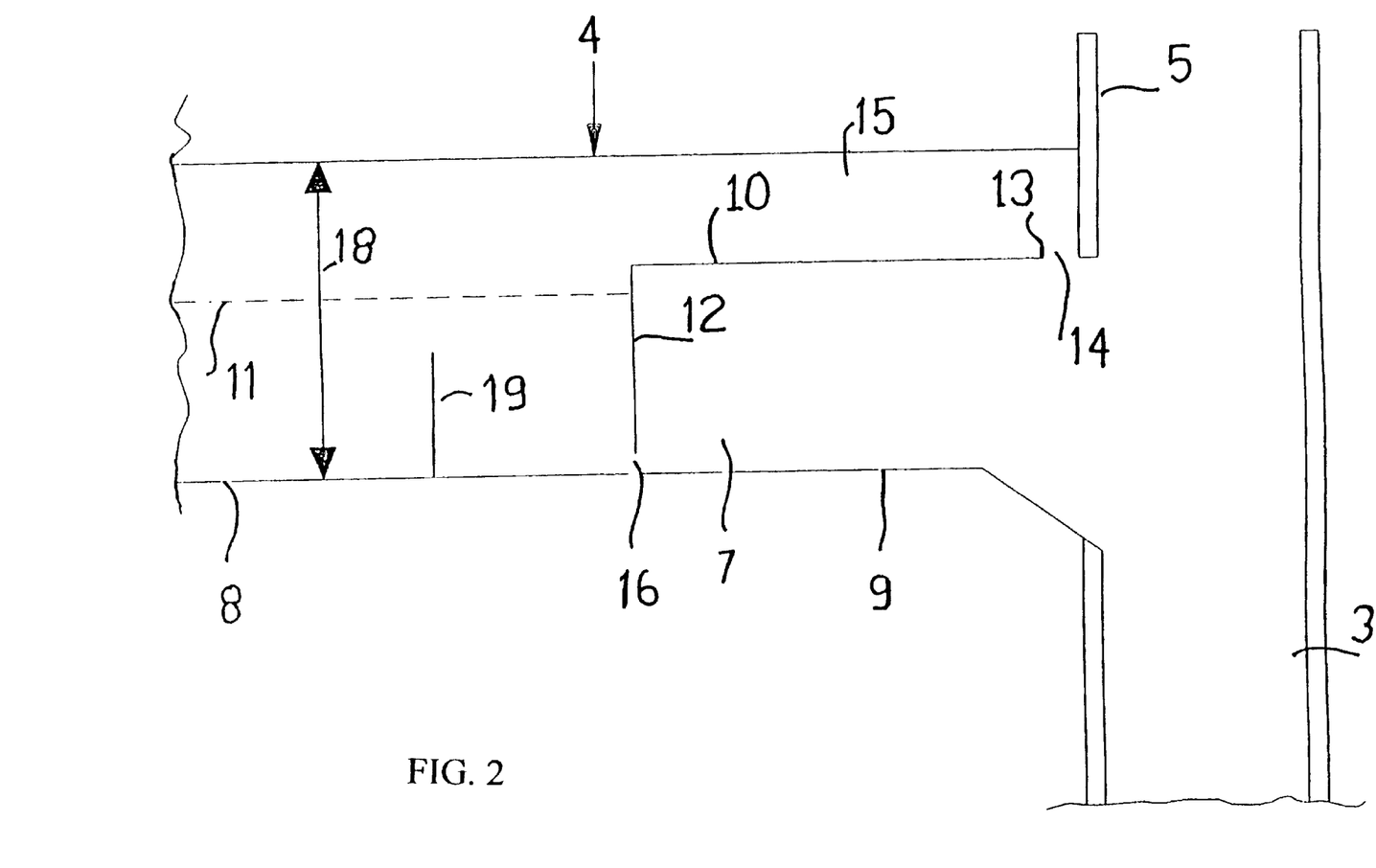
FIG. 2 illustrates the embodiment of FIG. 1, seen as a cross-section in the middle of the settler.

As is seen in FIG. 2, the front edge 5 of the settler is at the bottom part connected to the uptake shaft 3, so that the dispersion flows to the distribution channel 7 prior to being discharged to the settler proper. The distribution channel is formed in the settler bottom part, so that the settler bottom 8 also constitutes the bottom 9 of the distribution channel, and the settler front edge 5 partly also serves as the front edge of the distribution channel. The lid 10 of the distribution channel is located at a height where it is higher up than the phase borderline created in the rear part of the settler (illustrated by the dotted line 11), so that it is located in the dispersion zone left in between the separating phases. This is an important detail particularly in situations where the aqueous solution should be settled as pure as possible, although the aqueous solution has a high viscosity. Said arrangement prevents light organic remains from being left as entrapped substances in the aqueous solution. From FIG. 1 it is also seen that the lid part 10 of the distribution channels is narrowed towards the side edges 6 of the settler. Thus the back wall 12 of the distribution channel is, when seen on the horizontal level (from top), placed in an inclined position with respect to the inner settler walls, so that on the settler edges 6, it is located nearer to the settler front edge 5 than in the middle part of the settler.

In between the front edge 13 of the distribution channel lid 10 and the front end 5 of the settler, there is formed a uniform slot 14, through which the major part of the dispersion flows from the distribution channel 7 via the top route 15 to the settler proper 4. However, because part of the dispersion already has been divided into phases, for the separated aqueous phase there is left a uniform slot 16 in between the distribution channel back wall 12 and the settler bottom 8, through which slot the aqueous phase can flow onto the settler bottom. Through the top slot 14, at least ⅔, advantageously even more than 90% of the dispersion that has flown into the distribution channel flows to the settler, and the rest goes through the bottom slot 16. Both the width of the top slot and the height of the bottom slot are advantageously adjusted so that the slots are narrowest in the middle part of the settler and widen towards the edges; however, this is carried out so that for instance the width of the settler top slot in the settler edge area is no more than twice the slot width in the middle of the settler. The fluctuation of the slot width ensures an even feed along the whole width of the settler, which procedure evens out the feed even if the uptake shaft bringing in the dispersion would not open exactly to the middle of the settler.

By means of the distribution channel structure, there is created a dispersion flow front extending over the whole settler width, which front is first directed upwards in an inclined fashion, and thereafter curves softly, loosing speed due to gravity, to a nearly horizontal flow. As was maintained above, in the front end of the settler, the dispersion flows mainly above the distribution channel. It has proved to be successful to feed the dispersion upwards and at first as a flow directed along the front end of the settler, because the dispersion flow, when slowing down, is better distributed in the sideways direction owing to gravity, and at the same time it is further evened out. The flow speed of the dispersion discharged through the distribution channel slots is adjusted to be at least 0.3 m/s, advantageously within the range 0.5–1.0 m/s.

As is seen in FIG. 1, the flow can be further rectified in the settler direction by means of longitudinal baffle plates 17, which extend somewhat further into the settler than the rear wall 12 of the distribution channel in the middle part of the settler.

In the distribution channel 7, the dispersion flow speed is of the same order or somewhat lower than in the discharge slots 14 and 16. Now the flow speed in the distribution channel is of the order 0.2–1.0 m/s, advantageously within the range 0.4–0.8 m/s. When for instance the total flow of the dispersion to be separated is of the order 3,000 m³/h, it is advantageous to construct a distribution channel with a height that is about ⅔ of the total solution height 18. With such flows, the distribution channel length in the middle of the settler is of the order 1.5 m and narrows towards the settler edges, being there only about a fifth of the length of the middle part of the settler.

As is apparent from the above description, only a small part, at highest ⅓ of the dispersion flowing into the distribution channel, is removed through the bottom slot 16. Also the dispersion or separated aqueous phase that has flown through said discharge slot is set into vertical motion, because when seen in the main flow direction of the settler, the settler is provided, after the bottom slot, with a permanent overflow plate 19, over which the flow passes. The overflow plate extends upwards for a distance that corresponds no more than half of the settler solution height 18; advantageously it is 0.15–0.35 times the solution height. The overflow plate is placed in the settler in an essentially perpendicular position against the settler edges, and its distance from the distribution channel back wall 12 in the middle of the settler is about half of the distribution channel length at the point in question. Another alternative is that the overflow plate is arranged in parallel to the distribution channel back wall. The overflow plate reduces, to a significant degree, the counterpressure caused in the settler by the separated aqueous solution during extraction.

Figure 3:
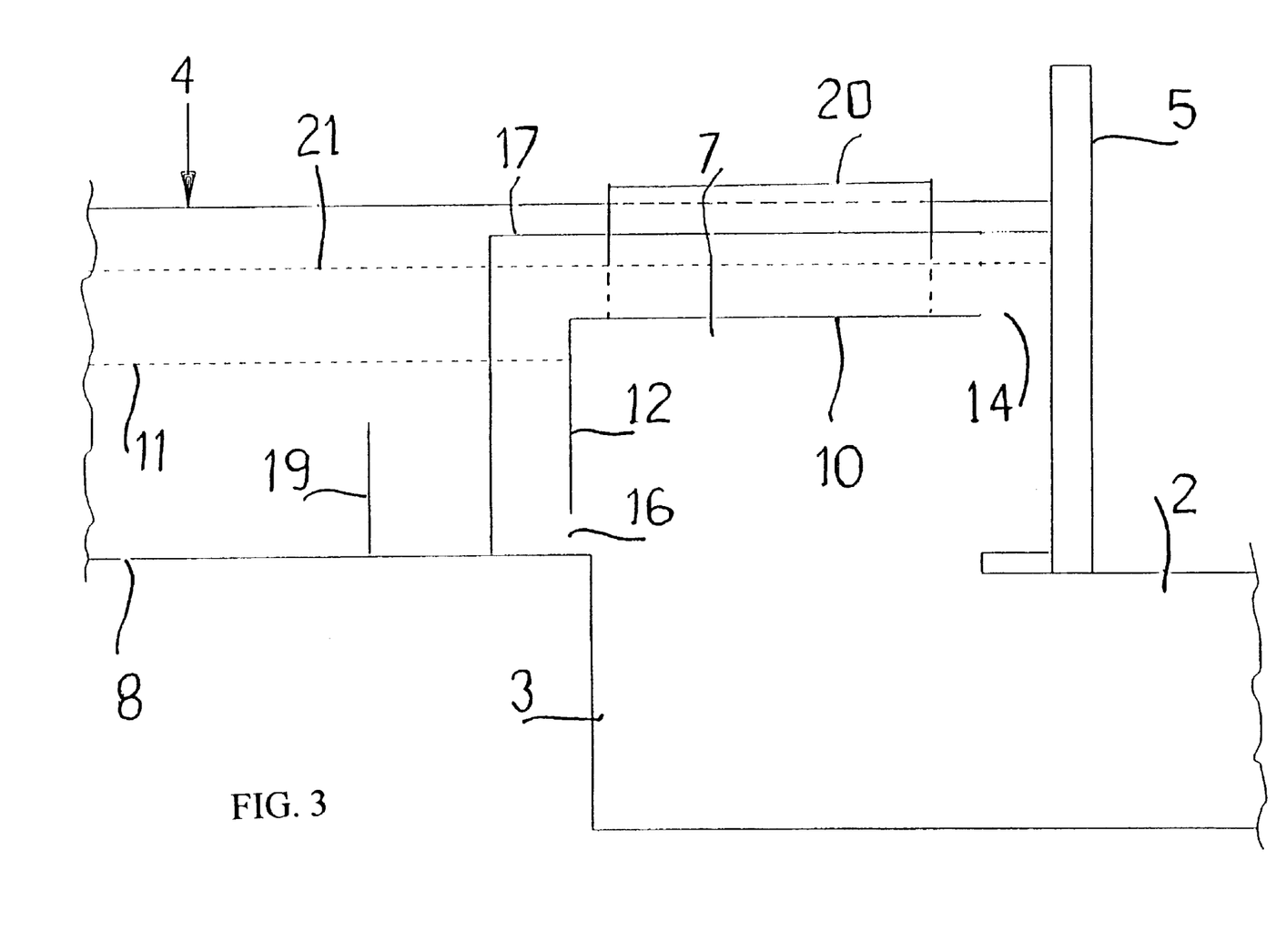
FIG. 3 illustrates another uptake shaft and channel structure of the settler, seen as a cross-section, where the dispersion uptake shaft is located inside the settler.

According to FIG. 3, the dispersion coming from the mixer is discharged through the dispersion channel 2 and the uptake shaft 3 directly into the settler, in the distribution channel 7. In other respects, the structure of the distribution channel corresponds to the structure illustrated in FIGS. 1 and 2, but the top part of the distribution channel can also be provided with a feeding/sampling cylinder 20 located above the dispersion channel, said cylinder extending from the distribution channel lid 10 upwards and extends clearly above the settler solution surface 21, over the settler side walls 6. From FIG. 3, there is also seen that the baffle plates 17 continue downwards, as far as the settler bottom. For the sake of simplicity, the baffle plates are shown as a side-view illustration only in this drawing.

Figure 4:
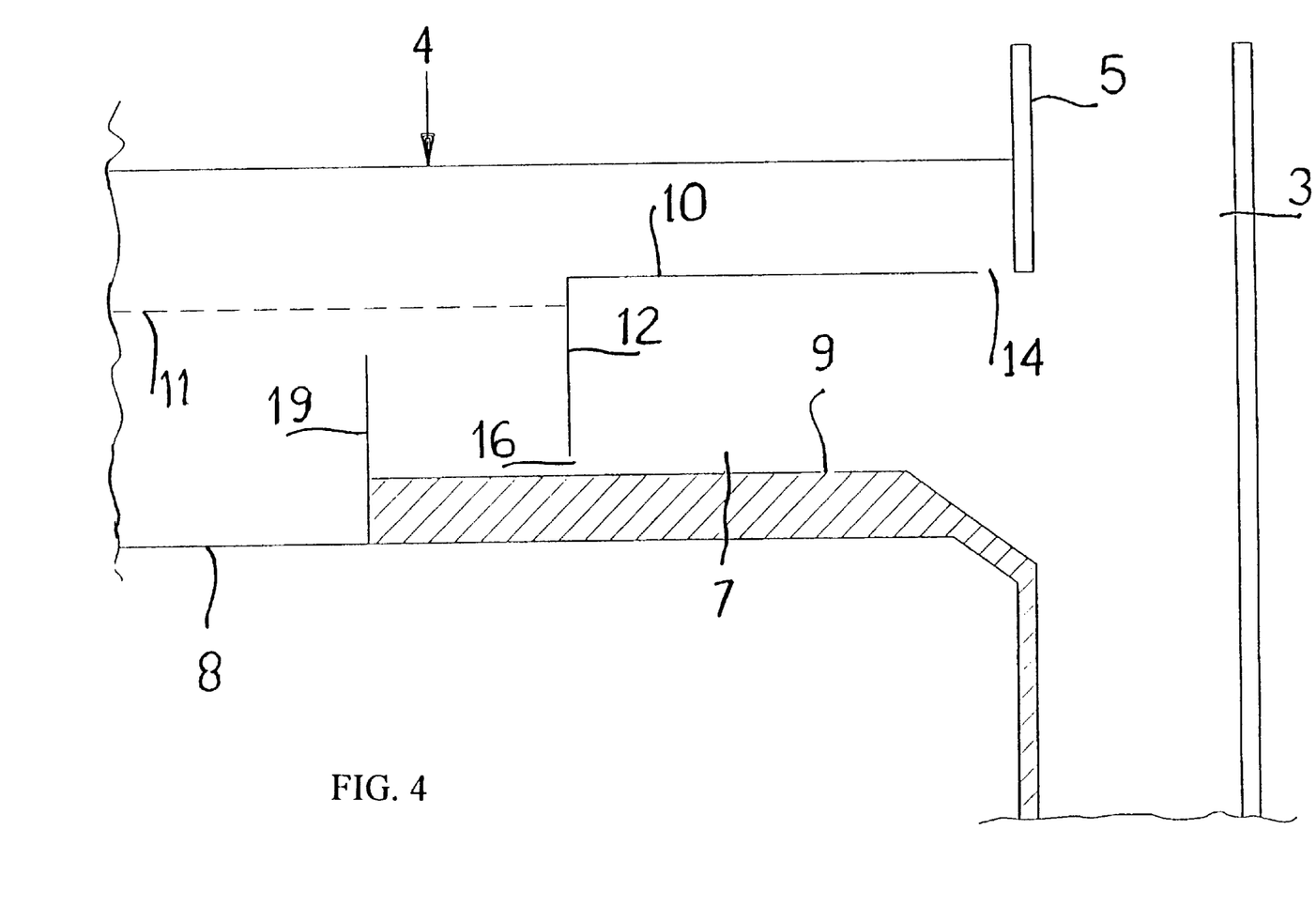
FIGS. 4 and 5 illustrate other structural alternatives for an apparatus according to the invention, seen as a cross-section in the middle of the settler.

FIG. 4 introduces a structural alternative according to which the settler bottom is raised at the distribution channel, but otherwise the settler structure corresponds to the one illustrated in FIG. 3. Also here, the settler front wall 5 partly serves as the front wall of the distribution channel. The structure illustrated in the drawing is advantageous particularly in cases where the total solution flow remains smaller, being for example of the order 2,000 m³/h. According to the drawing, the dispersion uptake shaft is located outside the settler, but it can also be located therein.

Figure 5:
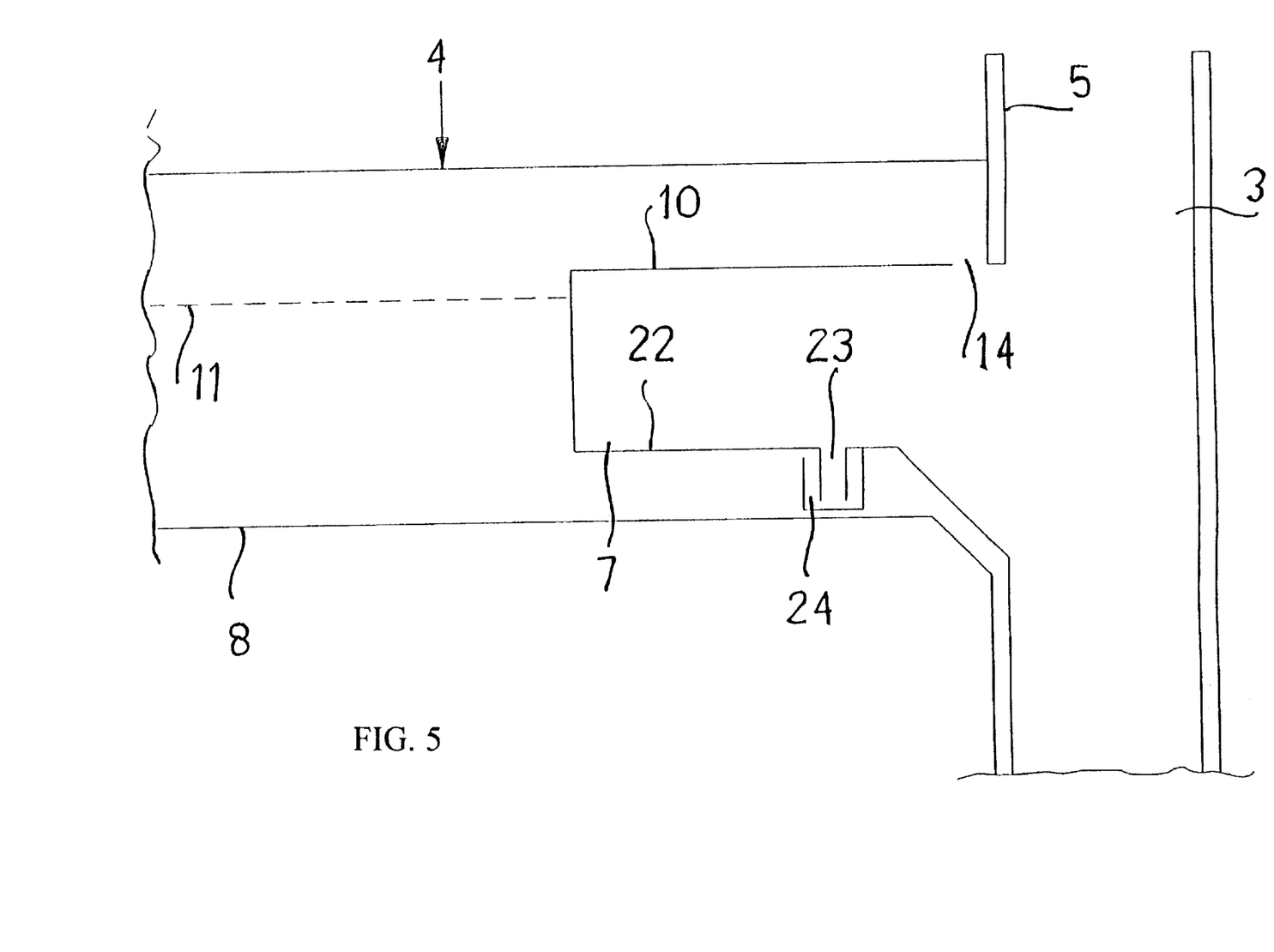

In the structural alternative illustrated in FIG. 5, the uptake shaft 3 opens up to the distribution channel 7, the bottom 22 whereof is located in the bottom part of the settler, but somewhat higher than the bottom 8. Also now the dispersion fed into the distribution channel flows mainly through the top slot 14. The separated aqueous phase flows via vertical tubes 23 arranged at the distribution channel bottom to countercylinders 24 surrounding said tubes and rising upwards from the settler bottom. The countercylinder is filled with the aqueous solution and it also keeps the tube 23 filled with the aqueous solution. The number of vertical tubes and countercylinders in both distribution channel is 1–5, and they are distributed evenly over the whole settler width. If the number of tubes and cylinders in each distribution channel is only one, they are advantageously placed in the edge area of the settler. This arrangement functions as a hydraulic lock, so that only a minimal part of the dispersion flows to underneath the distribution channel. However, if some of the dispersion circulates to underneath the distribution channel, it rises upwards against the distribution channel bottom and softly proceeds in the settler. Thus the aqueous solution settled in the settler remains clear of organic solution drops. Like in earlier cases, also here the dispersion can be fed either to the inside or to the outside of the settler.

The above described alternative with a uniform discharge opening for the dispersion is particularly advantageous in such liquid-liquid extraction applications where the mixing easily causes tiny droplets. In these arrangements, it has been a conscious choice to avoid slot flows proceeding at speeds surpassing 0.5 m/ls and the collision of dispersions against the feed end of the settler. When the flow is discharged from the distribution channel through a uniform slot, the shearing forces tearing the flow field are avoided; such shearing forces can be created owing to the slot currents and the more peaceful zones located in between them. In the above described embodiments, the major part of the dispersion is also conducted to be discharged to the settler from above the distribution channel; especially organic solution droplets are advantageously removed to the upper part of the settler, because when being discharged to the bottom part of the settler, they are—owing to their slow rising speed—left in the aqueous solution even in the rear end of the settler, and thus prevent the creation of clear solutions.

If the solutions in liquid-liquid extraction are not particularly sensitive to dropping, there can also be used structure to be described below; in said structure, the dispersion is conducted from the distribution channels to the settler proper through distribution channels provided with several separate apertures. The front edge of the distribution channel is not formed of the front end of the settler, but is a separate structure.

Figure 6:
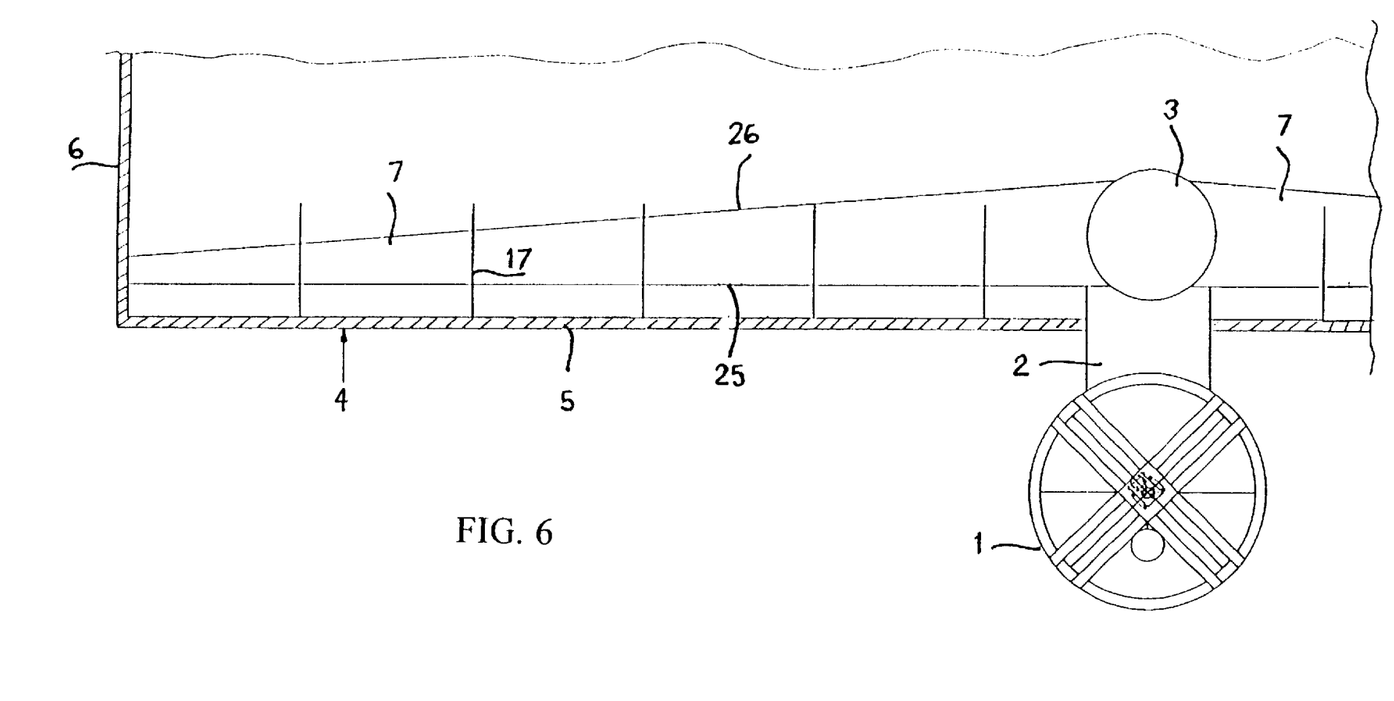
FIG. 6 illustrates yet another dispersion uptake shaft and settler channel structure, seen as a partial top-view elevation.

In the embodiment according to FIG. 6, the mixer 1 is connected, by intermediation of a dispersion channel 2, to an uptake shaft 3, which in this case is arranged inside the settler 4, in the middle part of the feed end 5. To the uptake shaft 3, there are connected distribution channels 7 extending to the side walls 6 of the settler; only one of said channels is completely seen in the drawing. Thus the uptake shaft opens up to the distribution channels. The front edge 25 of said channels, opening towards the settler feed end 5, is substantially parallel to the settler feed end both in the width and height directions, but the back wall 26 is inclined towards the front end in a fashion described above.

Figure 7:
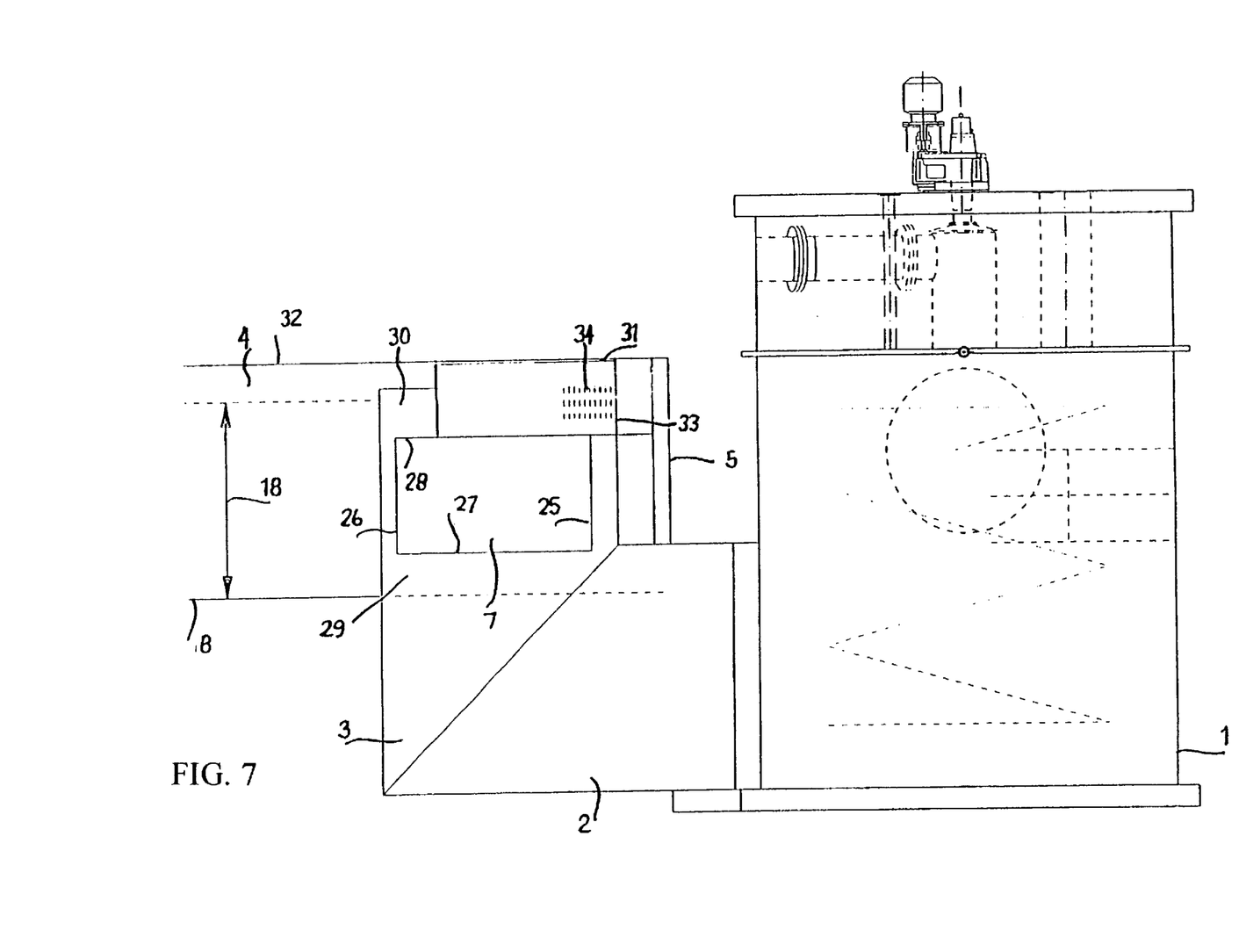
FIG. 7 illustrates the structure according to FIG. 6, seen as a cross-section in the middle of the settler.

The bottom part 27 and lid part 28 of the distribution channels 7, seen in FIG. 7, are narrowed towards the side edges 6 of the settler, as is seen in FIG. 6, so that the transversal area of the channels becomes smaller towards the side walls. The bottom 27 of the distribution channels 7 is higher than the settler bottom 8, as is seen in FIG. 7. Thus there is formed a lower route 29 in between the distribution channel bottom and the settler bottom, and the dispersion discharged through said lower route 29 can start flowing towards the rear end of the settler. The height of the lower route left in between the channel and the settler bottoms is or the order 0.05–0.25 times the solution height in the front end of the settler. However, the major part of the settling dispersion starts to flow through the upper route 30 left above the lid part 28 of the distribution channel, because the height of the distribution channels 7 is of the order 0.2–0.6 times the solution height 18 in the front end of the settler.

The uptake shaft 3 is designed so that the top part of the uptake shaft corresponds to the feeding/sampling cylinder 20 illustrated in FIG. 3, so that the top edge 31 of the uptake shaft rises to the level of the settler top edge 32. Now the uptake shaft extends so high that it can be constructed as open at the top, without the chance that the dispersion should be discharged to the settler therethrough. In the above specification we described how the dispersion flow discharged from the uptake shaft is divided into distribution channels directed towards the settler side walls. In order to balance the settler flows, part of the dispersion must be fed in to the settler also in the uptake shaft area, and therefore the front edge 33 of the uptake shaft is provided with vertical slots 34 in the vicinity of the liquid surface. The vertical slots are arranged in a sector of 60–90° towards the feed end 5 of the settler. The width of the slots is determined so that they allow such a dispersion flow that corresponds to the flow in the uptake shaft area, when the whole dispersion flow is divided evenly over the whole width of the settler.

Figure 8:
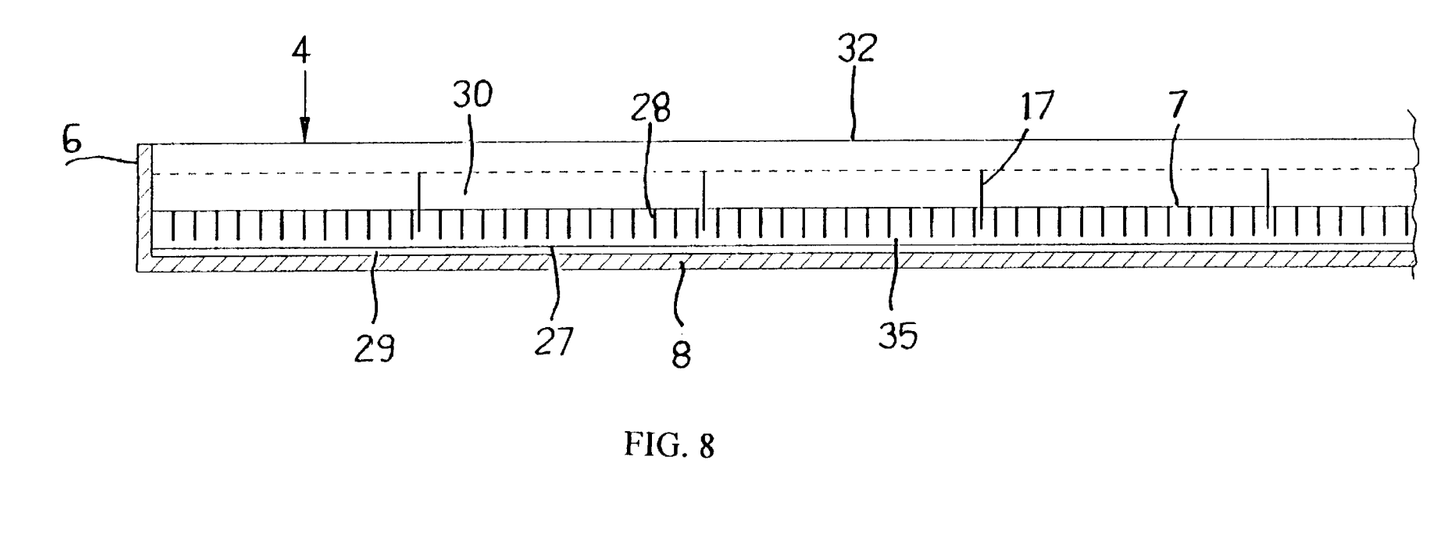
FIG. 8 illustrates the structure of FIG. 6, seen in the lengthwise direction of the settler (i.e. in the flowing direction of the solutions).

From FIG. 8 it is seen that the front edge 25 of the distribution channel 7 is provided with distribution apertures 35, which are advantageously vertical slots in shape. In order to achieve an even predistribution, the dispersion flowing speed out of the slots must be at least 0.7 m/s, and advantageously within the range 0.9–1.4 m/s. If the outflowing speed is over 2m/s, it results in a pressure loss in the distribution apertures, the loss being of the order 2 kPa, which means that the pressure loss rises too high. The number of vertical slots per channel is advantageously 20–60, and the width of said slots is such that said outflowing speed is achieved. The distance of the front edge 25 of the distribution channel from the settler feed end 5 is ⅙–½ of the distribution channel length at the middle point of the settler, advantageously of the order ⅓ of the channel length.

The dispersion flowing out of the distribution channel is distributed against the settler feed end and is further turned, in the sideways direction, so that it evens out to flow from above and under the distribution channel towards the rear end of the settler. In order to further rectify the flow to follow the lengthwise direction of the settler, in between the front edge of the distribution channel and the feed end of the settler, there are placed baffle plates 17 parallel to the lengthwise direction of the settler, so that said baffle plates further turn to continue above and underneath the distribution channel, in an upper and a lower route, and they thus form a solid bed surrounding the channel. The number of said plates is 7–15 per distribution channel, and the baffle plates are advantageously arranged approximately at regular intervals. When seen in the lengthwise direction of the settler, the baffle plates 17 advantageously extend somewhat over the rear edge 26 of the distribution channel, although this is not absolutely necessary as regards the plates located on the top side. The height of the plates placed on top of the distribution channel is ⅓–⅔ of the liquid height on top of the channel.

After the distribution channels, the dispersion flows in traditional fashion in the settler provided with picket fences and is separated into two separate solution phases before the rear end of the settler.

On the basis of the above description it can be maintained that by means of a distribution channel located inside the settler at the settler feed end, even in wide settlers the dispersion can be evenly distributed over the whole settler width, and details of the distribution channel can be adjusted within the scope of the invention. Thus for instance an arrangement where the uptake shaft is placed elsewhere than exactly in the middle part of the settler still falls within the scope of the invention. Also other modifications in the distribution channel details, which were not explained in the specification above, can be considered to fall within the scope of the invention.

What is claimed is:

1. An apparatus for receiving a dispersion of a liquid-liquid extraction, the apparatus comprising:
    a wide settler having a front wall and two side walls,
    an essentially continuous dividing wall structure extending across the settler to the side walls thereof and substantially dividing the settler into an inlet space, between the front wall and the dividing wall structure, and a settling space, the dividing wall structure having an upper edge and there being an upper slot between the upper edge of the dividing wall structure and the settler to allow the dispersion to pass from the inlet space to the settling space, and
    an uptake shaft extending to the settler from below for delivering the dispersion to the inlet space,
    whereby the dispersion delivered to the inlet space through the uptake shaft passes from the inlet space into the settling space through said upper slot.

2. An apparatus according to claim 1, wherein the settler has a bottom wall that bounds both the settling space and the inlet space.

3. An apparatus according to claim 2, wherein the dividing wall structure includes a top wall spaced from the bottom wall of the settler and the upper edge of the dividing wall structure is an edge of the top wall.

4. An apparatus according to claim 3, wherein the top wall of the dividing wall structure is substantially horizontal.

5. An apparatus according to claim 3, wherein the settler contains dispersion and there is a phase boundary in the dispersion and the top wall is above the phase boundary.

6. An apparatus according to claim 2, wherein the dividing wall structure includes a top wall spaced from the bottom wall of the settler and having a front edge and a rear edge, the front edge of the top wall being the upper edge of the dividing wall structure, and the dividing wall structure includes a rear wall that extends downwards from the rear edge of the top wall.

7. An apparatus according to claim 6, wherein the rear wall of the dividing wall structure has a lower edge and there is a substantially continuous lower slot between the lower edge of the rear wall of the dividing wall structure and the bottom wall of the settler.

8. An apparatus according to claim 7, further comprising an overflow plate in the settling space and extending upwards from the bottom wall of the settler.

9. An apparatus according to claim 8, wherein the settler has a middle part substantially halfway between the two side walls and in the middle part of the settler the overflow plate is at a distance from the dividing wall structure equal to about half the distance between the front wall of the settler and the rear wall of the dividing wall structure in the middle part of the settler.

10. An apparatus according to claim 8, wherein the settler contains dispersion up to a predetermined height above the bottom wall of the settler and the overflow plate extends upwards to a height that is less than half said predetermined height.

11. An apparatus according to claim 10, wherein the height of the overflow plate is 0.15–0.35 of said predetermined height of the dispersion in the settling space.

12. An apparatus according to claim 1, wherein the dividing wall structure has a lower edge and there is a substantially continuous lower slot between the lower edge of dividing wall structure and the settler.

13. An apparatus according to claim 12, wherein the settler has a middle part substantially halfway between the two side walls and the upper and lower slots are of minimum width in the middle part of the settler and increase in width towards each side wall.

14. An apparatus according to claim 13, wherein the maximum width of the upper slot is no more than twice the minimum width of the upper slot.

15. An apparatus according to claim 1, wherein the inlet space decreases in length perpendicular to the front wall from a maximum in a middle part of the settler towards the side walls.

16. An apparatus according to claim 1, wherein the inlet space decreases in cross-sectional area perpendicular to the front wall from a maximum in a middle part of the settler towards the side walls.

17. An apparatus according to claim 1, wherein the settler has a bottom wall that bounds both the settling space and the inlet space and the bottom wall has an upper surface that is at a greater height in the inlet space than in the settling space.

18. An apparatus according to claim 1, wherein the settler has a bottom wall and the dividing wall structure includes a bottom wall spaced vertically from the bottom wall of the settler and formed with an aperture providing communication between the inlet space and the space between the bottom wall of the dividing wall structure and the bottom wall of the settler.

19. An apparatus according to claim 18, further comprising a vertical tube extending downwards from the bottom wall of the dividing wall structure and a counter cylinder surrounding the vertical tube and having an upper end above a lower end of the vertical tube, and wherein the aperture in the bottom wall of the dividing wall structure debouches into the vertical tube.

20. An apparatus according to claim 1, wherein the uptake shaft is located inside the settler and opens into a middle part of the settler at the feed end of the settler.

21. An apparatus according to claim 20, wherein the settler has a top edge and the uptake shaft extends upwards at least as high as the top edge of the settler.

22. An apparatus according to claim 1, wherein the uptake shaft is located outside the settler and opens into a middle part of the settler through the front wall of the settler.

23. An apparatus according to claim 1, further comprising a plurality of baffle plates, each baffle plate partially surrounding the dividing wall structure and extending away from the front wall of the settler to a location beyond the dividing wall structure.

24. An apparatus according to claim 23, comprising between 7 and 15 baffle plates between a middle part of the settler and each side wall.

25. An apparatus according to claim 1, wherein the settler contains dispersion up to a predetermined height above a bottom wall of the settler and the dividing wall structure is about $2/3$ of said predetermined height.

26. An apparatus according to claim 1, wherein said upper slot is substantially continuous.

27. An apparatus for receiving a dispersion of a liquid-liquid extraction, the apparatus comprising:

a wide settler having a front wall and two side walls, a dividing wall structure extending across the settler to the side walls thereof, the dividing wall structure including a front wall, a top wall, and a rear wall, the front wall of the dividing wall structure being spaced from the front wall of the settler and being between the front wall of the settler and the rear wall of the dividing wall structure, the front wall of the dividing wall structure being formed with a plurality of distribution apertures for feeding dispersion from the inlet space towards the front wall of the settler, and the dividing wall structure substantially dividing the settler into an inlet space, between the front and rear walls of the dividing wall structure, and a settling space, and an uptake shaft extending to the settler from below for delivering the dispersion to the inlet space, whereby the dispersion delivered to the inlet space through the uptake shaft passes from the inlet space into the settling space through said distribution apertures.

28. An apparatus according to claim 27, wherein there are between 20 and 60 distribution apertures between a middle part of the settler and each side wall of the settler.

29. An apparatus according to claim 27, wherein the settler has a bottom wall and the dividing wall structure includes a bottom wall spaced from the bottom wall of the settler to provide a lower route for dispersion to flow towards the rear of the settler and the dividing wall structure includes a top wall and an upper route is provided over the top wall of the dividing wall structure.

30. An apparatus according to claim 27, wherein the settler has a middle part halfway between the side walls and in the middle part of the settler the front wall of the dividing wall structure is spaced from the front wall of the settler by a distance that is ½ to ⅙ of the distance between the front wall of the dividing wall structure and the rear wall of the dividing wall structure.

31. An apparatus according to claim 27, further comprising a plurality of baffle plates, each baffle plate partially surrounding the dividing wall structure and extending away from the front wall of the settler to a location beyond the rear wall of the dividing wall structure.

32. An apparatus according to claim 31, comprising between 7 and 15 baffle plates between a middle part of the settler and each side wall.

* * * * *